United States Patent
Hwang

Patent Number: 6,145,843
Date of Patent: Nov. 14, 2000

[54] HYDRODYNAMIC LIFT SEAL FOR USE WITH COMPRESSIBLE FLUIDS

[75] Inventor: Mingfong Hwang, Phoenix, Ariz.

[73] Assignee: Stein Seal Company, Kulasville, Pa.

[21] Appl. No.: 09/175,870

[22] Filed: Oct. 19, 1998

[51] Int. Cl.$^7$ .................................................. F16J 15/30
[52] U.S. Cl. ...................... 277/400; 277/401; 277/543; 277/544; 277/581; 277/580
[58] Field of Search .................. 277/400, 401, 277/543, 544, 547, 581, 580, 579

[56] References Cited

U.S. PATENT DOCUMENTS

| | | | |
|---|---|---|---|
| 5,509,664 | 4/1996 | Borkiewicz | 277/400 |
| 5,516,118 | 5/1996 | Jones | 277/400 |
| 5,558,341 | 9/1996 | McNickle et al. | 277/400 |

*Primary Examiner*—Anthony Knight
*Assistant Examiner*—Enoch E. Peavey
*Attorney, Agent, or Firm*—Zigmund L. Dermer

[57] ABSTRACT

This invention discloses a completely different hydrodynamic gas seal configuration from both the Rayleigh bearing and other prior art. Instead of the shallow, wide, and short single pocket geometry for the Rayleigh bearing, and instead of the multiple depth grooves of the other prior art teachings, the hydrodynamic seal in this invention has a sealing face with lift pockets therein that are deep (normally in the range of about 0.010 inches to about 0.025 inches deep), narrow, long, multiple, coextensive, parallel, and single-depth. This invention incorporates the same basic hydraulic principle of generating pressure rise by the shearing gradient between the rotating shaft and stationary carbon elements, and therefore produces a force which is opposite in direction to the rubbing force generated by the ambient pressure drop across the seal. In this invention the forces are more evenly balanced across the axial face of the seal ring segments, thereby accommodating any conicity of the shaft race. Seals of both the circumferential type and the face type are provided. Furthermore, the lift pockets are of a depth sufficient that, in the event of wear of the sealing face, an increase in pressure in the lift pockets occurs as a consequence of the reduction in depth to move the seal member away from the rotating shaft, thereby causing the seal gap to be self-regulating in size.

15 Claims, 4 Drawing Sheets

HYDRODYNAMIC LIFT SEAL FOR USE WITH COMPRESSIBLE FLUIDS

BACKGROUND OF THE INVENTION

This invention relates to seals for use with compressible fluids such as gases. There are many applications wherein housings are provided with interior sections having rotating parts therein, wherein one of the interior housing sections must be isolated from another by means of a seal system cooperating with the rotating part. Such rotating part may be a shaft or a component mounted on a rotating shaft for applications such as gas turbines, fluid pumps, or compressors. Seals for fluids in such applications may comprise circumferential seals or face-type seals.

"Circumferential Seal" is a name describing a generic type of sealing device used widely, inter alia, on aircraft engine applications. These seals consist primarily of several arcuate carbon and/or graphite segments arranged circumferentially to form a continuous relatively stationary sealing ring around the periphery of a rotating shaft. The segment ends contain overlapping tongue and socket joints to restrict leakage at the end gaps. For the aircraft engine sump seal application, these seals are used to separate ambient areas of high pressure air from an oil wetted area at lower ambient pressures and serve two major functions: (1) prevention of oil leakage from the lower pressure compartment, and (2) minimization of the flow rate of hot air from the high pressure area to the oil wetted compartment.

In order to achieve the long wear life demanded in modern aircraft engine or steam turbine applications, it is necessary to reduce the contact forces (unit loads) between the stationary seal carbon segments and the rotating shaft race. At present, state-of-the-art circumferential seals for compressible fluids are limited to pressure drops across the sealing face on the order of 20 to 40 psi in order to meet wear life requirements. In efforts to increase the pressure range of these seals, much work has been expended in the application of hydrodynamic gas bearing technology (normally called "Rayleigh pockets bearing") to the rubbing face of the carbon seal segments. In such devices, a pressure rise is generated by the velocity shearing gradient between the rotating shaft and stationary carbon elements. This pressure rise, acting against the bearing area on the surface of the seal segment, generates a force which is opposite in direction to the rubbing force generated by the ambient pressure drop. This effectively reduces the rubbing loads and increases the pressure range capability of the seal. The major problem with Rayleigh pockets is their very shallow depth (normally in the range less than 0.001 inches). This inherent shallowness does not allow sufficient latitude to prevent wearing away the gas bearing during periods when surface speed is too low to generate sufficient hydrodynamic forces, or when centrifugal inertia, pressure, and thermal gradients distort the rubbing interfaces and result in loss of gas sealing capacity. In other words, the Rayleigh pocket gas bearings are destroyed when 0.001 inches wear occurs. Therefore, the shallowness of these bearings pockets, combined with the loss of wearing surface area caused by introduction of the pockets, has limited the acceptance of this configuration as a viable candidate for long-life high pressure seal applications.

An attempt has been made to increase the depths of the pockets in a Rayleigh-type system by increasing both the depth and length of the pocket and providing a connecting exhaust pocket for the fluid in the Rayleigh groove of even deeper dimension. This can be seen in U.S. Pat. No. 5,145,189, issued to Adam N. Pope on Sep. 8, 1992. While the Pope solution to the elimination of the shallow Rayleigh pockets may be successful in the sense that the longer pockets of Pope are deeper than the normal Rayleigh pockets, it will be noted that a significant amount of excess precise machining must be performed to create the seal components. Note that the Pope design must provide not only a longer Rayleigh-type pocket, but also an exhaust pocket of an even greater depth, and a transverse communication slot between the Rayleigh pocket and the exhaust pocket, which must also be machined.

It is the specific intention of this invention to eliminate such complex and expensive machining while achieving a long-lived seal for fluids having substantially deeper lift pockets than those of the normal Rayleigh design. At the same time, this invention provides a seal with very high pressure differential levels, long life, lower specific rubbing loads for equal radial forces, and therefore lower heat generation rates than those of both Pope and the prior Rayleigh design. In addition, bore sealing dam widths can be increased to offer a more rugged structure to prevent handling and assembly damage when compared with the otherwise more fragile structures of the prior art. Also, the force-generating pockets of this invention are more uniformly distributed across the bore of the seal rings, thereby accommodating any conicity of a shaft race.

For purposes of this description, a primary sealing surface is provided on both a circumferential seal embodiment and a face seal embodiment. Where the primary sealing surface is of constant or single diameter, it is referred to herein as a bore surface or bore region, particularly in connection with circumferential seals. For face-type seals and generic usage, the term sealing surface or sealingface will be utilized.

SUMMARY OF THE INVENTION

This invention discloses a completely different hydrodynamic gas seal configuration from both the Rayleigh bearing and the Pope patent. Instead of the shallow, wide, and short single pocket geometry for the Rayleigh seal, and instead of the multiple-depth grooves of the Pope patent, the hydrodynamic seal in this invention has a sealing surface (or bore surface) with lift pockets that are deep (normally in the range of about 0.010 inches to about 0.025 inches), narrow, and long. The seals of this invention have sets of multiple, co-extensive, parallel single-depth pockets, which are substantially longer than Rayleigh pockets and are separate from adjacent pockets except at the inlet end. This invention incorporates the same basic hydraulic principle of generating pressure rise by the shearing gradient between the rotating shaft and stationary carbon elements, and therefore produces a force which is opposite in direction to the rubbing force generated by the ambient pressure drop across the seal. In this invention the forces are more evenly balanced across the axial face of the seal ring segments, thereby accommodating any conicity of the shaft race.

This invention specifically provides, in each seal segment surrounding a rotatable shaft, a circumferential seal wherein the bore region of the seal segment is formed having an inlet adjacent the leading edge of the segment exposed to the high pressure side of the seal segment, and a plurality of constant-depth elongated lift pockets or lift grooves extending parallel to each other from the inlet across a substantial portion of the bore region of each of the seal segments and terminating short of the trailing edge of the seal segment. The elongated lift pockets may be two, three, or four in number, depending upon the application and the parameters such as pressure, temperature, viscosity of the compressible fluid, etc. The lift pockets are otherwise separate from each other, except at the inlet region. By thus providing a plurality of constant-depth, elongated, parallel lift pockets extending from a common inlet, a single machining depth for the pockets is established, which can be performed in a single machining operation wherein the pockets may be cut concurrently. Alternatively, each pocket may be cut separately. No transverse connection other than at the inlet is required for the seal bore region, making this seal segment considerably less expensive to manufacture. Also, the axial position of the lift pockets distributes the forces created by the shearing gradient more evenly in the axial direction across the seal segments.

In accordance with this invention, the depth of the lift pockets is such that in the event of wear of the bore surface resulting in a reduction of pocket depth the force generated in the now shallower pocket is increased to increase the seal gap. Thus wear of the bore surface serves to increase the pressure in the pockets to increase the seal gap, making the seal gap essentially self-regulating in size.

In another embodiment, a face-type seal for compressible fluids having arcuate yet generally parallel constant-depth grooves extending from an inlet exposed to the high pressure casing region is also provided for applications wherein an axially movable seal ring is mounted opposite to a radially extending rotatable component such as a shaft runner or a gas turbine engine component.

DETAILED DESCRIPTION

Figure 1:
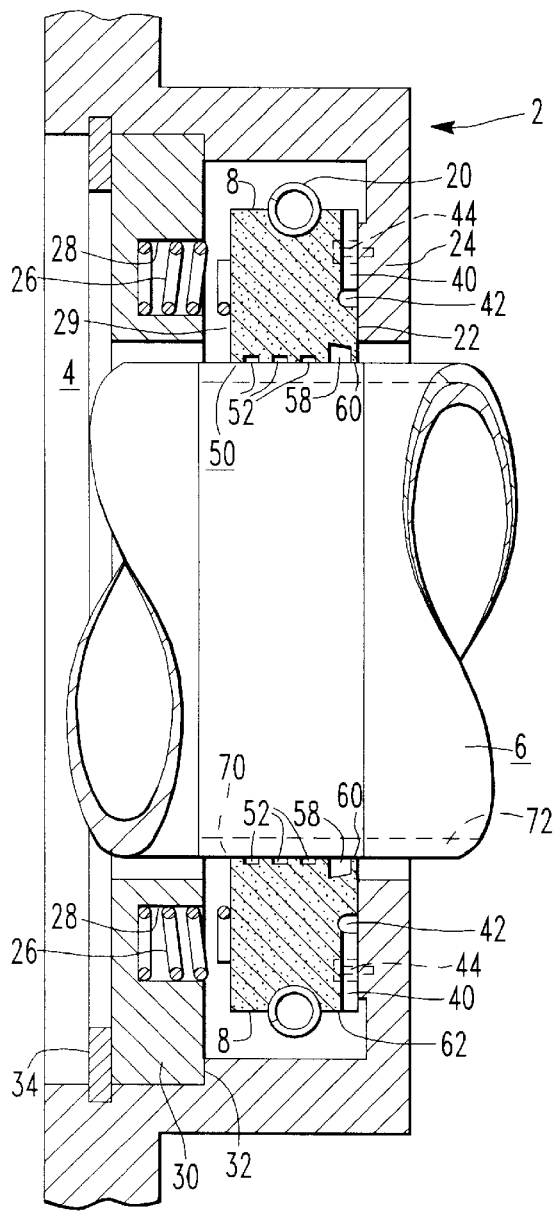
FIG. 1 is a vertical section through a seal in accordance with this invention, sealing between a housing and a rotating shaft.

As shown in FIG. 1, a housing 2 forms a chamber 4 adapted to contain a compressible fluid such as a gas. A shaft 6 passes through the housing 2 into the chamber 4. A seal ring 8 in this example has four segments 10 (FIG. 2), although three or more segments may be employed in other examples. Each segment 10 has an offset tongue portion 12 with a diagonal face 14 which mates with a diagonally cut groove portion 16 on the adjacent segment 10 to provide for continuous sealing structure irrespective of any radial expansion or contraction of the seal ring 8. The segments 10 are urged into contact with the shaft 6 by a garter spring 20. The downstream faces 22 of segments 10 are urged against flange 24 of housing 2 by compression coil springs 26 contained in pockets 28 of closing ring 30, which is retained between housing shoulder 32 and retaining ring 34. The downstream face 22 of each segment 10 is provided with radial grooves 40 connected to a peripheral groove 42 to permit passage of fluids from chamber 4 into groove 42 to counterbalance in part fluid pressure on the high pressure side 29 to reduce the pressure loading of the segment against flange 24. Pins 44 (FIG. 1) mounted in flange 24 fit loosely in slots 46 in seal ring segments 10, respectively, to prevent the segments 10 from rotating, yet permit the segments to move toward and away from the shaft 6. Slots 46 are located in a central region of each segment 10.

Figure 2:
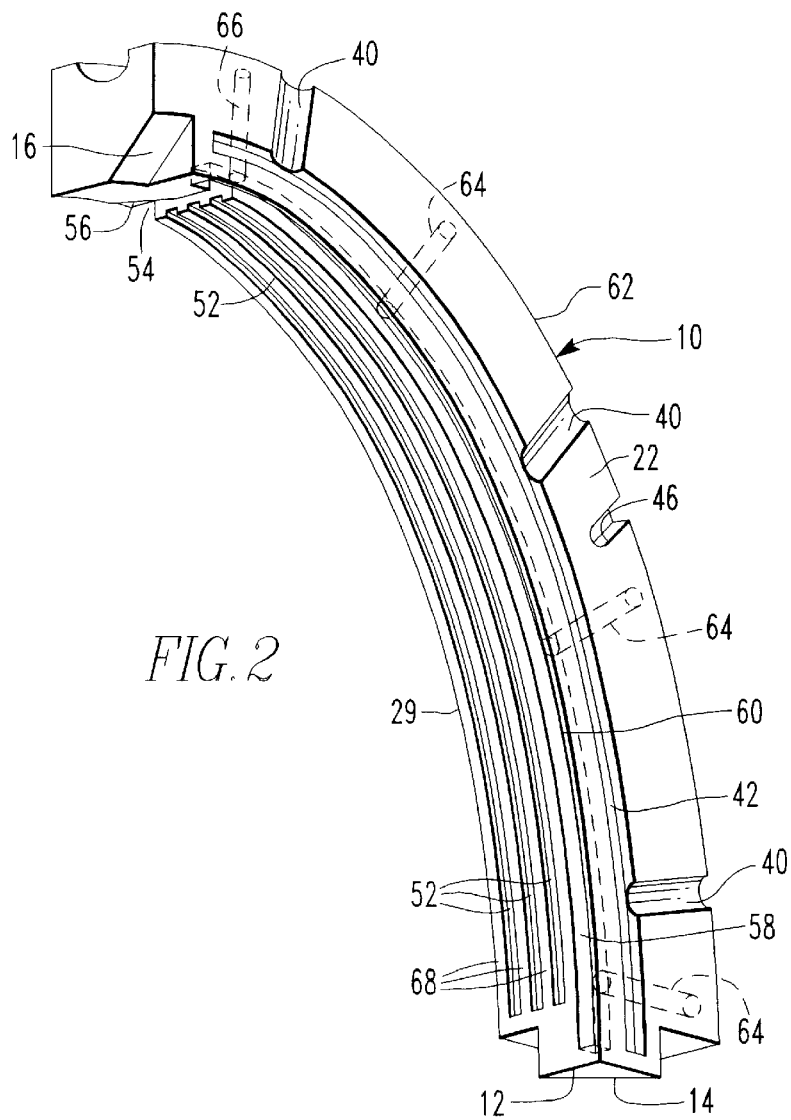
FIG. 2 is a perspective view of a segment of the seal ring shown in FIG. 1, taken from the low pressure side.
Figure 3:
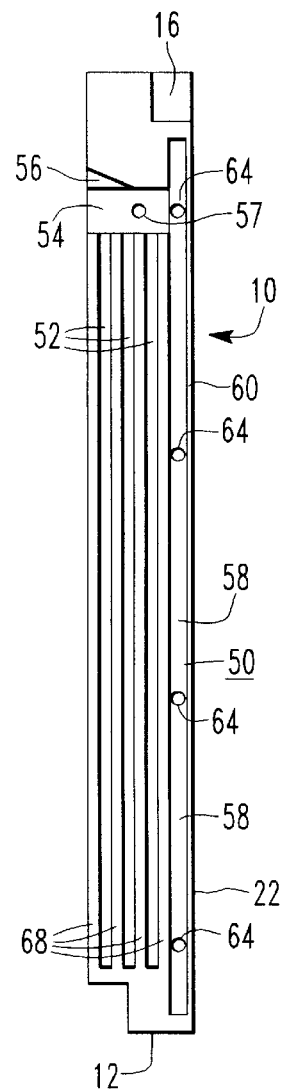
FIG. 3 is a developmental view of the bore region of the seal ring segment of FIG. 2.

As shown in FIGS. 2 and 3 hereof, the sealing face or bore surface 50 of each segment 10 has a plurality of shallow lift pockets or grooves 52, which extend parallel to each other in the circumferential direction along almost the entire length of each segment 10 and terminate short of the tongue portion 12 of each segment 10. The three lift pockets 52, which are illustrated in this example of the invention, extend circumferentially and are axially spaced from one another, the axial direction being the axial direction of the shaft 6. The only communication of pockets 52 with each other is with a plenum chamber 54 at the upper (upstream) end (FIG. 3) of the seal segment 10, with chamber 54 being exposed to the high pressure region of the seal housing to admit high pressure fluid to the leading end of each of the lift pockets 52. An angled portion 56 is formed in the bore surface 50 serving as a fluid scraper to assist fluid in entering plenum chamber 54. In addition, an opening 57 is formed in seal segment 10 extending from chamber 54 entirely through the seal segment 10 to the outer side 62 of segment 10, which side is also exposed to high pressure to ensure that high pressure fluid is at the leading edge of each of the lift pockets 52.

As can be seen clearly in FIG. 2, the depth of chamber 54 is in this example greater than the depth of each of the pockets 52 to ensure adequate fluid flow into the pockets 52. A sealing dam 60 is formed on the bore surface 50 adjacent the downstream edge 22 of seal segment 10, the latter edge being exposed to low pressure during operation of the seal system. An elongated groove 58 is formed upstream of, adjacent to, and parallel to the sealing dam 60 and is located on the high pressure side thereof Groove 58 essentially co-extends with sealing dam 60, but terminates short of the ends of seal segment 10. A plurality of openings 64 are located in a spaced, generally equidistant array along groove 58. Openings 64 extend from the bottom of groove 58 to the outer side 62 of the seal segment 10 and provide fluid communication of high pressure fluid from outer side 62 to the interior of groove 58 through openings 64 to ensure that the sealing dam 60 is exposed to high pressure in groove 58. The remaining surfaces on bore surface 50, i.e., the surfaces between each of the lift pockets 52, between lift pockets 52 and leading edge 29, and between lift pockets 52 and groove 58 serve as wear pads 68 for the seal segments 10. The circumferential pockets 52 serve as hydrodynamic lift pockets for seal 8, and desirably the lift pockets 52 are deadended about 0.20 inches from the end of the seal segment 10 to form a wear pad of that dimension between the trailing ends of the pockets 52 and the nose 12 of the seal segment 10. Thus when the four seal segments 10 are assembled, each seal segment 10 has three parallel, relatively deep pockets 52 (when compared to the depth of normal Rayleigh pockets)

extending circumferentially along substantially the entire surface of the seal segment 10, serving as hydrodynamic lift pockets. The hydrodynamic pressure in each lift pocket increases as a function of length of the pocket in the direction of rotation, decreases as a function of depth thereof, and is rather insignificantly affected by width. In accordance with this invention, the lift pockets 52, which are substantially deeper than 1 milli-inch, generate shearing forces of sufficient magnitude to move the seal segment 10 slightly away from the shaft race to provide relatively small leakage of high pressure fluid across the sealing dam 60 into the lower pressure region of the housing. The narrowness of the pocket 52 is created to increase the area of wearing surface or wear pads 68 on the bore surface 50 to extend the lifetime of the seal by reducing the rubbing load per unit area of wear pads 68 on the surface 50. Also, in this example the depth of the pockets 52 desirably is at least about 0.01 inches and up to about 0.025 inches. For certain fluids such as steam the range may be narrowed to from about 0.018 to about 0.023 inches, depending upon the number of pockets 52 formed in the seal segments 10 and other conditions in the seal environment.

Figure 1A:
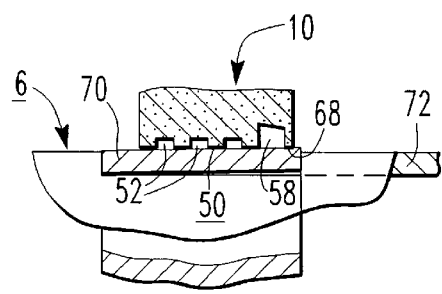
FIGS. 1A and 1B are fragmentary sectional views illustrating the rotating shaft having a sleeve insert thereon which serves as a race for the seal and wherein the insert in FIG. 1A has a conical taper with a narrow segment being on the left of the sleeve insert, and the insert of FIG. 1B has a conical taper with the narrowed section being on the right of the sleeve insert.
Figure 1B:
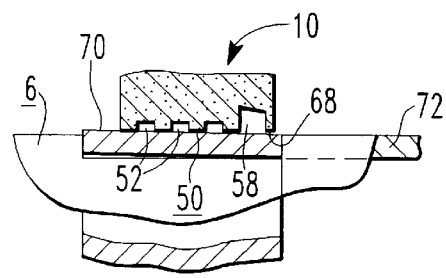

It is within the contemplation of this invention, as will be shown in another embodiment, that the central pocket 52 of the three pockets 52 can be eliminated without changing the pressure profile on the bore region. It is there, however, to accommodate the potential of more severe wear in the outer pocket, i.e., the pocket 52 located near the upstream (high) pressure side 29, which can be caused by race taper due to thermal distortion. This condition can be seen more clearly in FIGS. 1A and 1B, wherein the shaft 6 is provided with a sleeve or race insert 70, which is positioned to confront the seal segments 10 along the shaft. The sleeve or race 70 is held in position by an additional sleeve 72 mounted on the shaft and secured thereto by suitable means (not shown). In certain applications, however, it will be noted that thermal distortions of the race or sleeve 70 may occur, depending upon the thermal environment of the high and low pressure regions, and the heat generated in different regions of housing 2. The thermal distortion may result in the creation of conicity on the downstream side of the race 70, as depicted in FIG. 1A, wherein the race 70 takes on a slightly conical shape with the smaller end being located on the left or high pressure side of the seal ring segment 10 and the larger dimension of the cone being located on the downstream or low pressure side of the seal ring segment 10 (to the left of FIG. 1A). Alternatively, the sleeve or race 70 may be subjected to conicity in the opposite direction, as depicted in FIG. 1B, wherein the sleeve 70 has its larger dimension on the left-hand side, i.e., the high pressure side, of the seal ring segment 10 and its smaller dimension on the low pressure or downstream side of the seal ring segment 10.

While it is possible to plan for conicity of a seal race 70 in the design of the seal components, it is best to design for such conicity by accommodating slight wear in the axial direction. This is best achieved by providing lift pockets 52 which cover much of the axial dimension of the seal ring segments 10 and therefore can accommodate conicity in either direction, irrespective of the seal application.

As will be appreciated, all of the pockets 52 are of equal depth and therefore result in ease of machining and a less costly seal. Test results of seals of this invention indicated an increase in seal life (i.e., a reduction in wear and distortion) of about one order of magnitude and a reduction in seal ring heat generation (therefore, lower seal interface temperatures) and of the contact forces on the seal ring, both of which cause reduction in distortion when compared with seals of the prior art. Tests show that seals constructed in accordance with this invention are viable for high shaft speed (600 ft/sec.) and high pressure differential (100 psi) applications and still achieve long wear life.

Figure 4:
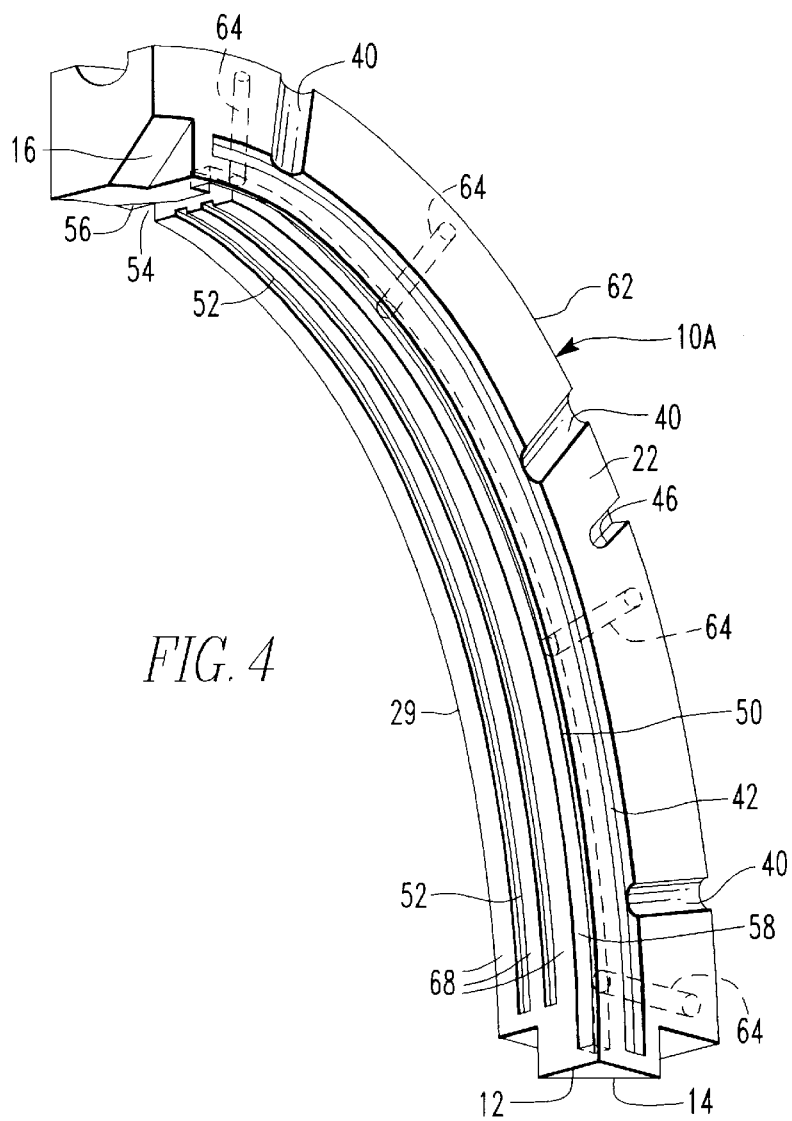
FIG. 4 is a perspective view of another embodiment of a seal ring segment taken from the low pressure side.
Figure 5:
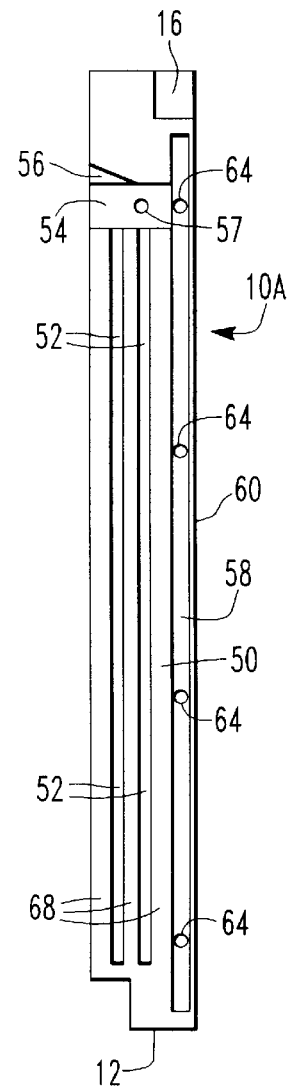
FIG. 5 is a developmental view of the bore region of the seal ring segment of FIG. 4.

With reference now to the embodiment of this invention in FIGS. 4 and 5, it will be noted that this embodiment shows seal ring segment 10A, and that like reference characters for like parts of seal ring segment 10A of FIGS. 4 and 5 and those of seal ring segment 10 of FIGS. 1 through 3 will be utilized and will not be described again. It will be seen that the only difference between the embodiment of FIGS. 4 and 5 and that of FIGS. 1 through 3 is the fact that only two lift pockets 52 are provided in the seal ring segment 10A of FIGS. 4 and 5, rather than the three lift pockets 52 of the embodiment of FIGS. 1 through 3. Seal ring segment 10A desirably is utilized for seals operating in steam/air environments wherein high pressure steam is located on the high pressure side of the seal ring segments 10A and low pressure air or an oil/air environment is located on the lower pressure side thereof. In this arrangement (FIGS. 4 and 5) the wear pads 68 on the seal bore surface 50 are somewhat larger in size than the equivalent wear pads 68 on the embodiment of FIGS. 1 through 3. Also, for applications other than steam/air systems where shaft race concentricity is not a problem, a seal ring segment 10A of FIGS. 4 and 5 may be employed without utilizing the middle or central lift pocket 52. This has been explained previously, inasmuch as the central pocket of FIGS. 1 through 3 is employed to more evenly distribute the shearing forces generated in the lift pockets 52 across the seal bore 50 and thereby minimize wear of the wear pads 68 located adjacent high pressure edge 29 on the seal bore surface 50. For steam/air applications, the depth of the lift pockets 52 in the FIGS. 4 and 5 embodiment desirably is in the range of about 0.015 inches to about 0.023 inches. It will be appreciated that factors which affect the designed depth of the lift pockets 52 normally comprise the viscosity of the compressible fluids being used in the application, the temperature of the fluids, the pressure drop desired across the seal, shaft diameter, shaft speed, etc. In one specific example of steam/air applications, the depth of pockets 52 was made in the range of about 0.015 inches to about 0.017 inches.

Figure 6:
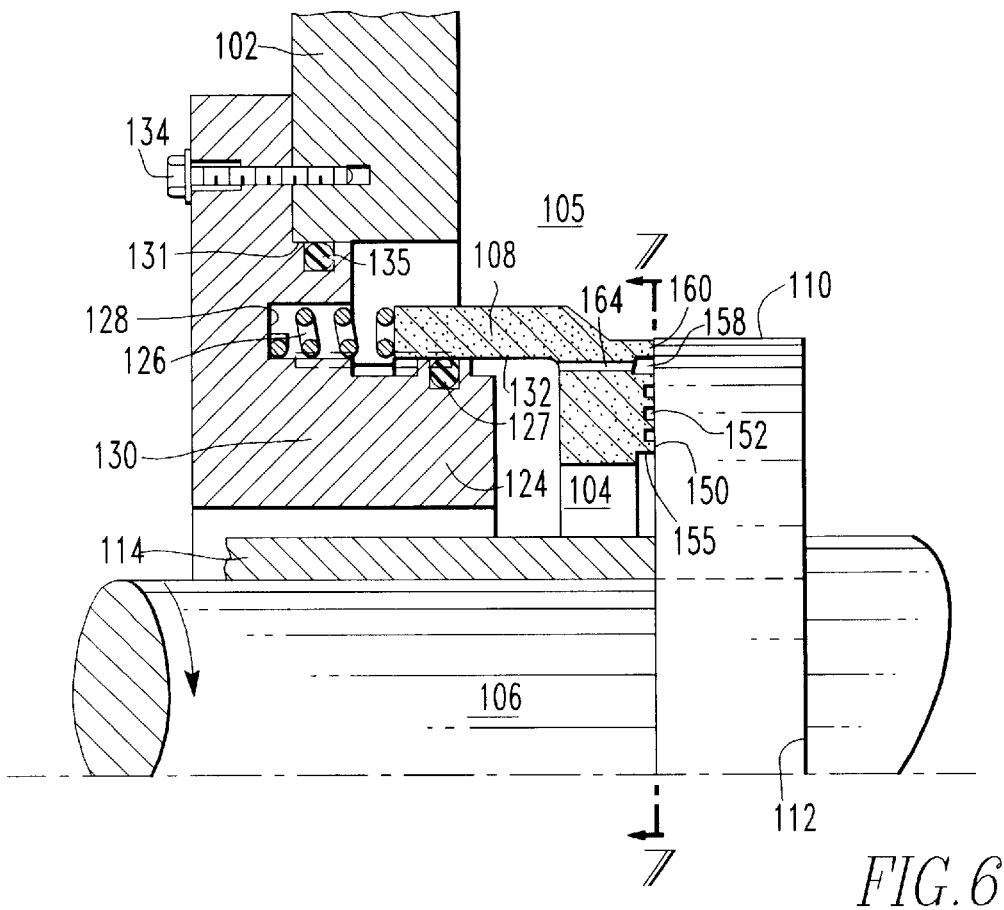
FIG. 6 is a sectional view, with the shaft shown in full, of another embodiment of this invention, wherein a face-type seal is provided for a runner on a rotating shaft.
Figure 7:
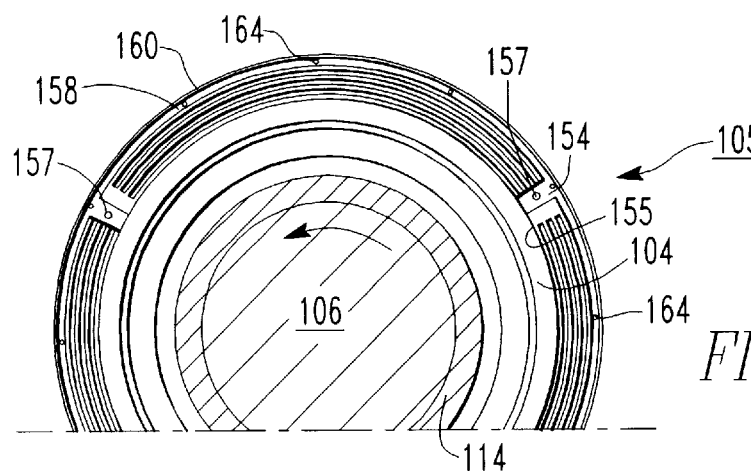
FIG. 7 is a section through FIG. 6 taken along the lines 7—7 of FIG. 6 and illustrating the sealing face of the face-type seal.

With reference now to the embodiment of this invention illustrated in FIGS. 6 and 7 of the drawings, it will be appreciated that the seal 108 constructed in accordance with the principles of this invention of the face type is depicted therein. The face-type seal assembly includes an annular seal ring 108, which is mounted for engagement with a circumferential shoulder or shaft runner 110 extending radially outwardly from a rotating shaft 106. The runner 110 is fixedly mounted on shaft 106 against an integral shoulder 112 formed on shaft 106, and shaft runner 110 is positioned to engage shoulder 112 by suitable means such as a shaft sleeve 114. The sleeve 114 is fixedly secured to shaft 106 by suitable means (not shown) and serves to maintain runner 110 against shoulder 112. In this embodiment of this invention, the higher pressure housing region 104 is located adjacent shaft 106 on the upstream end of runner 110, while the lower pressure region is located radially and axially outwardly of runner 110 and as depicted by reference character 105.

The rotating shaft 106 is mounted for rotation within a casing 102, only a portion of which is illustrated in FIG. 6, with the casing 102 including a seal mounting ring 130 extending inwardly therefrom toward shaft 106 and receiving shaft 106 in a central opening thereof Seal mounting ring 130 includes a shoulder 131 thereon which engages a complementary surface on housing 102 and is secured to housing 102 by suitable means such as bolts 134, only one of which is illustrated in FIG. 6, so that the adjacent surfaces of seal mounting ring 130 and housing 102 are in intimate contact. To prevent fluid flow from high pressure region 104 into lower pressure region 105 along the path between housing 102 and seal mounting ring 130, a sealing device such as an O-ring 135 is located in a complementary recess to prevent fluid flow except between seal ring 108 and runner 110. Seal mounting ring 130 also includes a flange 124 disposed thereon, axially extending toward but spaced from runner 110 and having the opening thereof surrounding shaft 106. Flange 124 is of annular configuration and receives the shaft 106 in the central opening thereof. The free end of flange 124 co-extends in part with a portion of seal ring 108 remote from runner 110, the seal ring being sized to receive the free end of flange 124 closely in the opening thereof formed by inner surface 132. A seal such as an O-ring 127 reacting between flange 124 and seal ring 108 is provided in a recess in flange 124, which recess faces the inner surface of seal ring 108. The O-ring 127 is sized to permit seal ring 108 to move reciprocally toward and away from shaft runner 110 in a sliding movement, yet preventing fluid flow across O-ring 127.

In this example, seal ring 108 is a unitary carbon/graphite piece, but it could also comprise a carbon/graphite ring insert mounted on a metallic backing ring with an interference fit to prevent leakage except along the seal gap. Springs 126 are formed in recesses 128 in the surface of seal mounting ring 130, which faces the seal runner 110, and the springs 126 engage the adjacent surface of seal ring 108 to urge the seal ring 108 into contact with the confronting surface of seal runner 110. Only one coil spring 126 is shown in FIG. 6; however, a plurality of coil springs 126 desirably are symmetrically disposed around the periphery of seal ring 108 to provide even balancing of the spring force on seal ring 108 at all circumferential locations.

FIG. 7 depicts the primary sealing face 150 of seal ring 108, with the face 150 being urged into rubbing engagement with the confronting surface of runner 110 under rubbing force created by the ambient pressure drop and coil springs 126, the rubbing engagement being hydrodynamically modified by forces generated in opposition to the rubbing force by action of seal pockets 152 in sealing face 150, which create shearing forces to minimize or eliminate physical engagement of seal ring 108 with runner 110 during at least high-speed rotation of shaft 106. In accordance with this invention, the outer or high pressure edge of seal face 150 is provided with a sealing dam 160 thereon which extends across the entire outer circumference of the face 150. A circumferential groove 158 positioned on the inner edge of the sealing dam 160 and extending inwardly along seal face 150 is provided. For proper seal operation, surface 132 (the seal balance diameter) is deliberately formed to be in essential alignment with the high pressure (inner) edge of sealing dam 160, the latter edge being the edge of dam 160 adjacent groove 158. Groove 158 is formed with a plurality of evenly spaced passageways 164 extending from the bottom thereof through a portion of the seal ring 108 to a surface on seal ring 108, which is exposed to the high pressure region 104, thereby assuring that high pressure is always in the interior of groove 158 on the high pressure side of the sealing dam 160. Also, at three 120° spaced intervals (although four 90° spaced intervals or more intervals may be employed in other examples) on the circumference of the primary seal face 150, there is provided a radial plenum 154, which extends from the high pressure edge (inner edge 155 in this example) and terminates in communication with groove 158. Three parallel, arcuate, equal-depth lift pockets 152 are formed in seal face 150 and extend from each plenum 154 in a counterclockwise direction, in this example depending upon the direction of shaft rotation; each pocket 152 terminates with its trailing end short of the next plenum 154. Wear pads are thereby formed between the trailing ends of each of the lift pockets 152 and the next plenum 154, as well as between adjacent pockets 152. Wear pads are also formed between outer pocket 152 and adjacent groove 158, and an additional wear pad is formed between the inner pocket 152 and the inner edge 155 of the primary sealing face 150.

Thus three sets of essentially narrow, equal-length, concentric lift pockets 152 are formed on the sealing face 150 of seal ring 108. The long pockets 152 of each set communicate with each other only at the leading or upstream edge through the common plenum 154, into which high pressure fluid from region 104 passes from the inner circumferential side 155 of plenum 154, which is open to the inner edge of sealing face 150 and therefore to high pressure region 104. Also, high pressure in plenum 154 is ensured by an opening or feeder port 157, which extends from each plenum 154 through a portion of seal ring 108 and terminates on a surface of the seal ring 108 that is exposed to high pressure chamber 104 in a manner similar to openings 164. The circumferential grooves or lift pockets 152 are essentially co-extensive with three sets of such co-extending pockets 152 positioned end to end to cover substantially the entire circumference of the sealing face 150. The lift pockets terminate short of the plenums 154 for the next set of pockets in the same manner as the pockets 52 terminate short of the ends of seal segments 10 in the embodiments of FIGS. 1 through 3. Shearing forces are created in the relatively long lift pockets 152 in sealing face 150 and oppose the rubbing forces created by ambient pressure and coil springs 126 to move seal ring 108 slightly away from rotating runner surface 110 and provide small but finite leakage in the seal gap extending between the sealing face 150 and the runner surface 110, which minimizes wear of the seal ring 108 and results in the seal ring having a significantly longer life than that of the rubbing seal. Because the length of the lift pockets is notably greater than that of Rayleigh pockets, the depth of the lift pockets is made significantly greater than 0.001 inches. In fact, the depth of the lift pockets of this invention can be at least about 0.01 inches and up to about 0.025 inches. For certain fluid applications such as steam/air, the range may be narrowed to a depth range of about 0.015 inches to about 0.023 inches. In addition, in the event of conicity caused by wear of the sealing components, such wear is more evenly distributed because of the large surface of wear pads formed between adjacent lift pockets 152 as well as the ends of the lift pockets and the wear pads between pockets 152 and groove 158. As discussed in connection with FIGS. 4 and 5, for certain applications only two co-extensive lift pockets 152 (rather than three) may be provided in the face-type seal ring 108. Similarly, the number of sets of lift pockets 152 need not be limited to three.

Furthermore, it is within the contemplation of this invention that the higher pressure region 104 could well be in the region located radially outwardly of the shaft runner 110, and the lower pressure region 105 could be adjacent shaft 106 without departing from the spirit and scope of this invention. In the latter case, however, as will be understood by persons skilled in the art, the location of the sealing dam and the lift pocket feeder plenums 154 would be reversed, so that the sealing dam 160 would be on the inner (lower pressure) edge of the seal ring closer to shaft 106, and the lift pocket plenums 154 would be exposed only to the higher pressure region located radially outwardly of seal ring 108. Of course, openings 164 and 157 would be formed to extend to surfaces on seal ring 108 that are exposed to high system pressure.

In this application, several variations of seal structures for compressible fluids employing lift pockets of significant depth when compared with Rayleigh pockets of the prior art have been illustrated. Combinations of the embodiments may be employed with each other and still fall within the scope and spirit of this invention. It is therefore specifically intended that this application be illustrative of this invention and not construed in a limiting sense except as required by the state of the prior art.

What is claimed is:

1. A seal segment for a circumferential seal for sealing compressible fluids having a high pressure side and a low pressure side, said seal segment having a bore region extending circumferentially between said sides, said bore region extending on said seal segment in the circumferential direction from a leading edge to a trailing edge of the segment, said bore region comprising:
   a. a bore surface having a sealing dam located at the low pressure side of said segment and extending circumferentially along the length of said segment, and having a sealing dam groove located adjacent to and extending parallel with the seating dam on the high pressure side of the sealing dam, and being essentially co-extensive therewith, said sealing dam groove being exposed to and providing high pressure therein,
   b. said bore surface including an inlet plenum adjacent the leading edge of said segment and communicating with a portion of said segment exposed to high pressure to provide high pressure in said inlet plenum,
   c. said bore surface having a plurality of co-extensive, parallel, shallow pockets spaced from and extending parallel to said sealing dam and having the leading edge of each of said shallow pockets in fluid communication with said inlet plenum, and having the trailing edge of said shallow pockets terminating in said bore surface adjacent to but short of the trailing edge of said segment, so that said pockets extend across the major part of said seal segment in the circumferential direction,
   d. said pockets being of substantially constant depth and substantially deeper than 0.001 inches, and
   e. said bore region formed with said shallow pockets connected with each other only by connection to said inlet plenum and said shallow pockets being otherwise effectively separate from any other pockets and from said sealing dam groove in said bore region.

2. The seal segment of claim 1 wherein the shallow pockets are of a depth of between about 0.01 inches and 0.025 inches.

3. The seal segment of claim 1 wherein the shallow pockets are each formed to be of a constant width.

4. The seal segment of claim 1 wherein the plurality of co-extensive, parallel, shallow pockets are three in number.

5. The seal segment of claim 1 wherein the plurality of co-extensive, parallel, shallow pockets are two in number.

6. The seal segment of claim 1 wherein the depth of the shallow pockets is between about 0.015 and 0.023 inches.

7. The seal segment of claim 1 wherein an opening is formed in the inlet plenum passing through a portion of the seal segment to a surface on the seal segment exposed to high pressure.

8. A stationary seal member adapted to control and minimize the leakage of a compressible fluid along a path between a primary seal face on said seal member and a complementary surface on a movable member adjacent to which said seal member is adapted to be mounted, said seal face terminating at two spaced edges, one of said edges adapted to be exposed to a compressible fluid in a first region at relatively higher ambient pressure, the second of said edges being essentially continuous and being adapted to be exposed to a second region at a relatively lower ambient pressure, said stationary seal member being formed when in its operating position to isolate said first and second regions except along the aforementioned path, whereby the compressible fluid is adapted to pass between said seal face and the complementary movable surface from said one edge toward said second edge, said stationary seal member being adapted to be resiliently mounted such that said seal face is movable under resilient force toward said complementary surface and into engagement therewith and against such resilient force away from said complementary surface to vary the gap between said seal face and said complementary surface, said stationary seal member having:
   a. a sealing dam formed on said seal face adjacent said second edge and an elongated sealing dam groove in said seal face positioned adjacent to and parallel with said sealing dam;
   b. at least two equidistantly spaced transverse inlet plenums formed in said seal face and extending from said first edge thereof transversely across said seal face and terminating in said elongated sealing dam groove forming a plurality of pads on said seal face between adjacent ones of said sealing dam groove, said first edge and the adjacent transverse inlet plenums respectively;
   c. each of said pads having a plurality of equal depth parallel and co-extensive lift pockets formed therein and extending from one of said transverse inlet plenums into the respective pad and terminating in said pad short of but near the next transverse inlet plenum, each of said lift pockets being exposed to said complementary surface and being formed such that, when said movable surface moves relative to said seal face, compressible fluid is moved into each of said lift pockets from its inlet plenum to the leading edge thereof and, by virtue of the velocity shearing gradient between said movable and stationary members, an increased pressure is generated in said lift pockets to urge said seal face away from said movable surface, said lift pocket depth being between at least about 0.010 inches and no more than about 0.025 inches, even after moderate wear of the pad made by rubbing against said movable surface, so that it continues to be of sufficient size to maintain a velocity gradient induced pressure increase therein, said seal member being formed such that in the event of wear of said seal member pads to reduce the depth of said lift pocket, the velocity gradient in said lift pocket is increased to increase the pressure in said lift pocket, whereby said gap is increased to cause said gap to be self-regulating in size, and
   d) said pads each having all of the co-extensive shallow pockets therein connected with each other only by connection to said inlet plenum, respectively, and said shallow pockets each being otherwise effectively separate from an other shallow pocket and from said sealing dam groove in said sealing surface.

9. The stationary seal member of claim 8 wherein the inlet plenums comprise three transverse grooves equidistantly spaced on said seal face.

10. The stationary seal member of claim 8 wherein said seal face comprises a unitary surface on said stationary seal member, and wherein said movable member comprises a rotating shaft, and wherein said complementary movable surface comprises a radially extending shaft runner surface, thus forming a face-type seal, and wherein said seal member is movable axially along said shaft, toward and away from said radial runner surface.

11. The stationary seal member of claim 8 wherein said plurality of equal-depth parallel lift pockets are three in number.

12. The stationary seal member of claim 8 wherein said plurality of equal-depth parallel lift pockets are two in number.

13. The stationary seal member of claim 8 wherein the depth of said lift pockets is between about 0.015 and 0.023 inches.

14. The stationary seal member of claim 8 wherein said lift pockets are of substantially constant width.

15. The stationary seal member of claim 8 wherein said movable member comprises a rotating shaft, wherein said complementary movable member comprises an axially extending circumferential surface on the surface of said shaft, wherein said stationary seal member is formed from three seal segments surrounding said shaft, and wherein said transverse inlet plenums and the parallel lift pockets connected to each transverse inlet plenum are formed on a separate seal segment, respectively.

\* \* \* \* \*